Sept. 28, 1965  M. STAP ETAL  3,208,775
SEAL FOR BUNG BUSHINGS
Filed May 8, 1962  2 Sheets-Sheet 2
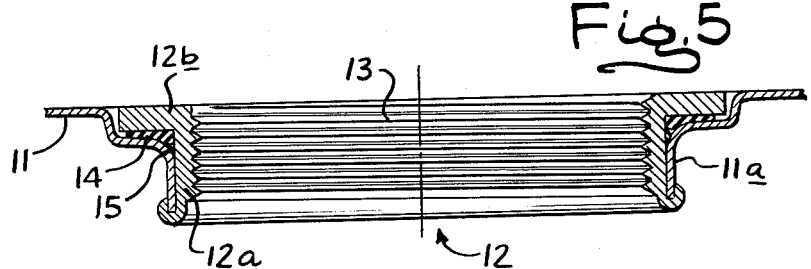
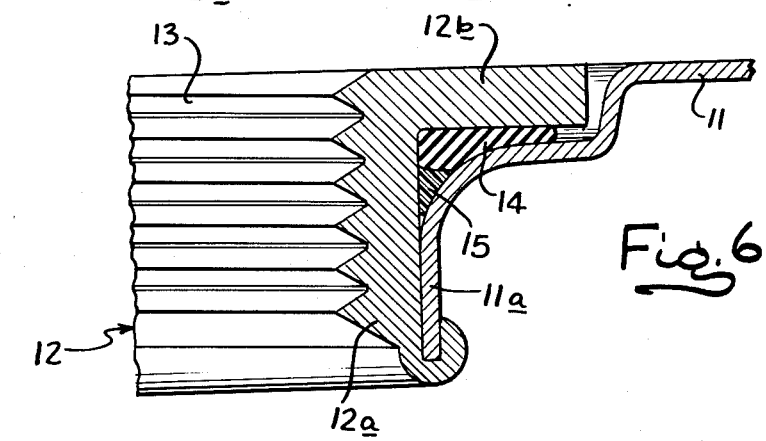
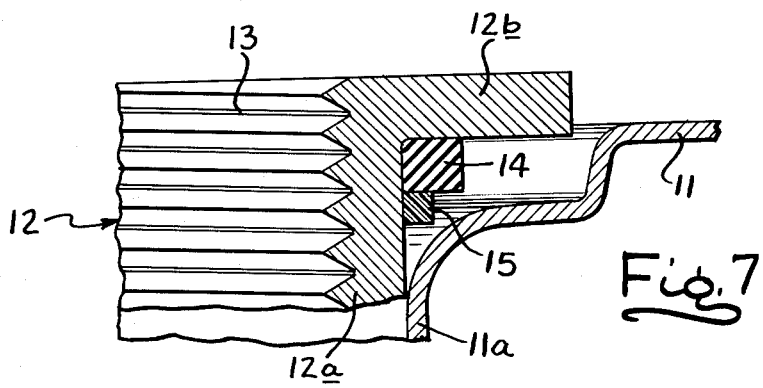
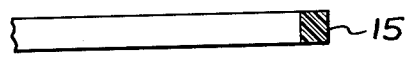
INVENTORS
MAXIMILIAN STAP
LEONARDUS ARNOLDUS NICOLAAS BIJVOET
by: Wolfe, Hubbard, Voit & Osann
ATTYS.

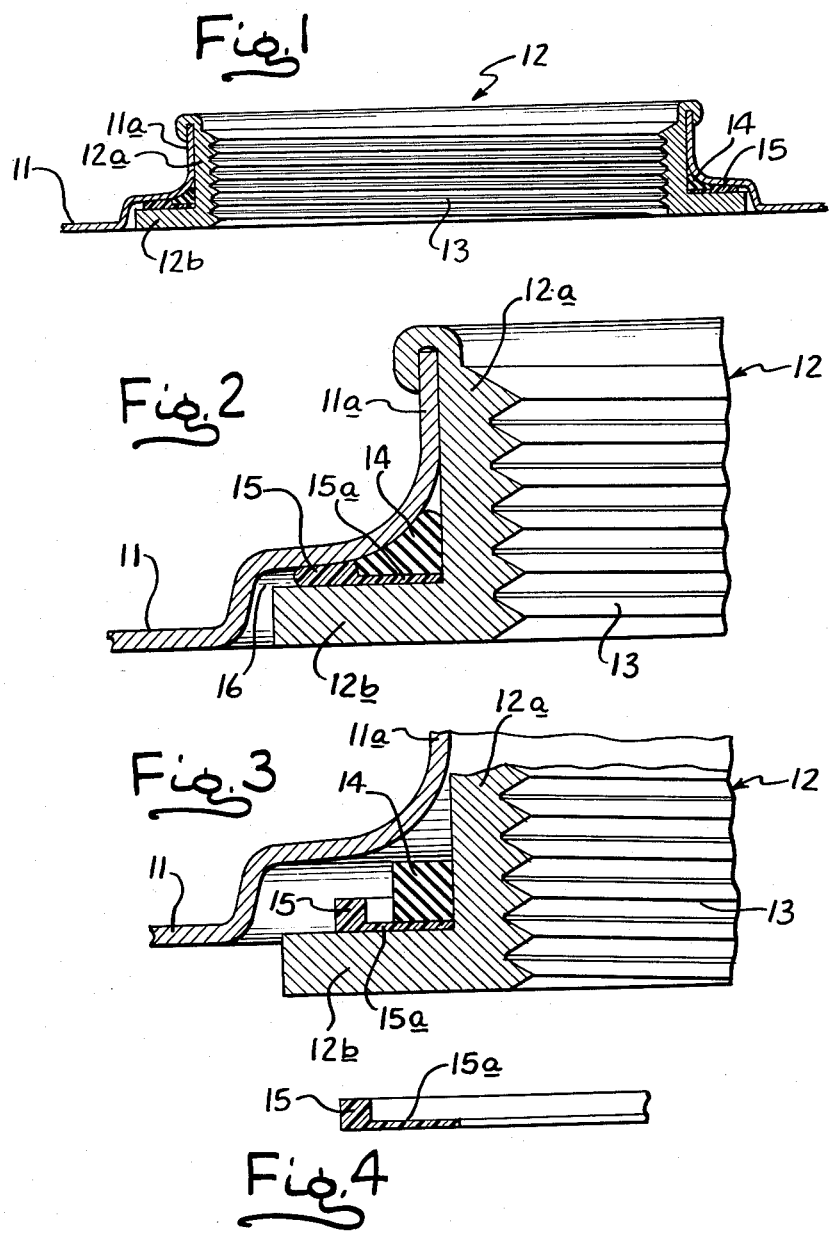

3,208,775
SEAL FOR BUNG BUSHINGS

Maximilian Stap, Amsterdam, and Leonardus Arnoldus Nicolaas Bijvoet, Overveen, Netherlands, assignors to Van Leer Industries Limited, Birmingham, England, a limited-liability company of Great Britain
Filed May 8, 1962, Ser. No. 193,172
Claims priority, application Great Britain, May 10, 1961, 16,993/61
8 Claims. (Cl. 285—204)

The present invention relates in general to shipping containers and, more particularly, to an improved shipping container bung-hole construction.

Heretofore, in conventional shipping containers of the type having a sheet metal wall with a bung-hole therein, the latter is usually defined by a bung-hole bushing secured to the container wall, a sealing gasket being interposed between the bushing and the container wall. These gaskets are usually made of a resilient material which substantially retains its resiliency when subjected to continuous pressure, for example, rubber. When the bung-hole bushing is secured to the container wall the gasket is clamped between the two parts and deformed, and because its material retains its resiliency the gasket will insure a permanent seal.

Lately, a rising demand has developed for sheet metal containers suitable for use in packaging, storing and transporting aggressive fluids, solvents, detergents, and the like, such, for example, as methylenechloride ($CH_2Cl_2$), chloroform or trichlorine-methane ($CHCl_3$) and trichlorine-ethylene ($ClHC=CCl_2$). However, some of these chemicals are known and sometimes actually used as solvents for rubber. In any event, such chemicals have a deleterious effect on rubber, and in particular cause rubber to swell phenomenally when coming into contact with the chemical.

If the rubber gasket were completely isolated from the interior of the container so that the fluid packaged therein could not come into direct contact with the gasket, or if the width of the gap between the flange of the bung-hole bushing and the container wall could be kept below a certain limit, the gasket would not be affected by the fluid and no difficulties would be presented. However, under normal manufacturing conditions such desirable conditions cannot be obtained. As a result, a "chain reaction" develops. First, the fluid penetrates through the gap between the bung-hole bushing flange or end and the container wall and comes into contact with the rubber gasket, attacking the material thereof and making it swell. This causes part of the gasket to protrude from the gap, thereby increasing the surface area of the gasket which is exposed to the action of the fluid, and promoting still greater swelling. As the swelling increases, more and more of the gasket is exposed to the fluid. Thus, not only are leakages caused, but moreover, the fluid is vitiated which often cannot be permitted, for instance when the fluid is to be used for pharmaceutical purposes.

If it were feasible to make sealing gaskets from a material having a high resistance to one or more of the aggressive fluids here concerned, such for example, as thermoplastic materials, then the problems of damage to the gasket and contamination of the fluid could be eliminated by substituting a thermoplastic gasket for the rubber gaskets heretofore employed. However, such thermoplastic materials have "cold flow" or "creep" characteristics—that is that they undergo a permanent deformation or set under continuous pressure—rendering the material unsuitable for this particular purpose, because after some time the sealing effect decreases and finally completely disappears.

It is a general aim of the present invention to provide an improved shipping container bung-hole construction which permits the use of resilient sealing material therein, yet wherein such material is protected from the aggressive fluids packaged within the container.

Another object of the invention is to provide an improved shipping container characterized by its ability to store and transport aggressive fluids, and wherein such fluids are maintained out of contact with the bung-hole sealing gasket, thus enhancing the sealing effect, prolonging the life of the gasket, and preventing contamination of the fluid.

It is a coordinate and more specific object of the invention to provide a shipping container bung-hole construction employing means for protecting sealing gaskets made of resilient material from the deleterious effects of aggressive fluids within the container, thus permitting use of conventional and commercially available resilient sealing gaskets.

In another of its important aspects it is an object of the invention to provide a sealing arrangement for shipping container bung-hole assemblies characterized by the fact that slight leakage of aggressive fluid past the protecting ring for the resilient gasket will cause the latter to swell, thereby blocking and sealing the leakage passage or passages and preventing further leakage. In this manner, liquid-tight integrity for the shipping container is maintained over prolonged periods.

Other objects and advantages of the invention will become apparent as the following description proceeds, taken in conjunction with the accompanying drawings, in which:

FIG. 1 is a vertical axial cross-sectional view of a bung-hole construction embodying the features of the present invention;

FIG. 2 is an enlarged cross-sectional view similar to FIG. 1 of part of the bung-hole construction;

FIG. 3 is a cross-sectional view similar to FIG. 2 showing the different parts before the assembly thereof;

FIG. 4 is a fragmentary cross-sectional view of an exemplary protecting ring used with the present invention;

FIG. 5 is a vertical axial cross-sectional view similar to that of FIG. 1 of a slightly modified bung-hole construction also embodying the features of the present invention;

FIG. 6 is an enlarged cross-sectional view similar to FIG. 2 of part of the modified bung-hole construction shown in FIG. 5;

FIG. 7 is a cross-sectional view similar to FIG. 6 showing the different parts before the assembly thereof; and, FIG. 8 is a fragmentary cross-sectional view, similar to FIG. 4, of a modified form of protecting ring used with the construction shown in FIG. 5.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the invention is to cover all modifications, equivalents and alternatives falling within the spirit and scope of the invention as expressed in the appended claims.

Referring now to the drawings, the sheet metal container wall 11 shown in FIG. 1 includes a bung-hole defined by a bung-hole bushing, generally indicated at 12, secured to the container wall in a manner hereinafter to be described and provided with internal screw threads 13 so as to permit reception of a bung or other closure member or dispensing means, such as a value or cock (not shown), the later being provided with external screw threads. However, it should be noted that the invention is not limited to the use of bung-hole bushings having screw threads and other types of bushings might be employed if desired.

The bung-hole bushing 12 is formed with a neck portion 12$^a$ inserted into a container wall collar 11$^a$ surrounding the bung-hole in the container wall 11, and with a base portion 12$^b$ extending laterally from said neck portion and positioned interiorly of the container, the neck portion being accommodated in a recessed portion of the container wall 11. To prevent the bung-hole bushing from rotating when a bung or similar closure member is screwed home or is to be unscrewed, the circumferential wall of the recessed portion and of the base portion are complementary and preferably non-circular, for example, polygonal.

In order to provide a shipping container having liquid-tight integrity, a sealing gasket 14 made of a resilient material which substantially retains its resiliency when subjected to continuous pressure, such as rubber, is interposed between the bushing 12 and the container wall 11 on the inner side thereof before inserting the bund-hole bushing 12 into the bung-hole. As best shown in FIG. 3, the sealing gasket 14 is positioned in the corner between the neck portion 12$^a$ and the base portion 12$^b$ of the bung-hole bushing. To prevent loss of the gasket when the bung-hole bushings are shipped separately, the gasket is dimensioned to fit snugly about the neck portion 12$^a$ of the bushing 12.

In accordance with one of the important aspects of the present invention, provision is made for preventing contact between the fluid contents of the container and the resilient sealing gasket 14, thereby preventing damage to the gasket and contamination of the fluid when the container is being used to store or transport aggressive fluids, while at the same time permitting use of resilient sealing gaskets which would otherwise be attacked by such fluids. In the exemplary form of the invention shown in FIGS. 1–3, this is accomplished by providing a protecting ring 15 which encircles the gasket 14 and which is mounted on the bung-hole bushing 12 before the latter is inserted into the container wall collar 11$^a$. Preferably the protecting ring 15 is made of a compressible or deformable material having a high resistance to aggressive fluids, solvents, detergents and the like, such, for example, as polyethylene or other suitable thermoplastic materials.

After assembly of the bushing 12, gasket 14, and protecting ring 15, the bung-hole bushing 12 is secured to the container wall 11, for example, by curling the top edge of the bushing neck portion about the top edge of the container wall collar 11$^a$. In this manner, the sealing gasket 14 as well as the protecting ring 15 are deformed and tightly clamped between the container wall and the bushing neck and base portions, thus providing a liquid-tight seal that will not be affected by the contents of the container.

As best shown in FIG. 2, the sealing gasket 14 is initially sealed and protected from the fluid in the container by the protecting ring 15 (the interior of the container being under the wall 11 in FIGS. 1–3). When the sealing effect of the ring 15 begins to gradually decrease because of the cold-flow properties of the material thereof, small fluid particles may penetrate through the gap 16 and past the protecting ring 15 to the sealing gasket 14. This will cause the gasket 14 to swell so that the leakage passage or passages are closed and sealed and thus the sealing effect will automatically be restored. Moreover, the protecting ring 15 prevents the sealing gasket 14 from protruding out of the gap 16 and thereby minimizes the danger of the gasket vitiating the fluid in the container. This latter advantage is emphasized because only minute quantities of fluid can penetrate to the sealing gasket, and hence the swelling effect is also limited.

If, for any reason, there is some slight shifting of the bung-hole bushing 12 in relation to the container wall collar 11$^a$, and the space in which the sealing gasket 14 is confined is locally decreased, the gasket will, since rubber is deformable but not compressible, assume a larger deformation in an outward direction, pushing the protecting ring 15 in front of it outwardly and causing the ring to seal the gap 16 even more tightly.

Inasmuch as the rubber sealing gasket 14 assumes a larger diameter when the parts of the bung-hole construction are assembled to the final position shown in FIGURES 1 and 2, the inner diameter of the polyethylene protecting ring 15 is preferably chosen somewhat larger than the outer diameter of the sealing gasket 14 when the latter is in an unstressed condition. This might lead to difficulties in centering the protecting ring 15, particularly if rather unskilled labor is employed for securing the bung-hole bushing in the container wall opening—moreover, the protecting ring might get lost during transport. In order to eliminate such difficulties, the exemplary protecting ring 15 is provided with an annular inwardly projecting membrane 15$^a$, the inner diameter of which is about equal to or only slightly larger than the outer diameter of the neck portion 12$^a$. Of course, during assembly of a container in this case, the protecting ring 15 is mounted on the bushing 12 first, the membrane insuring correct centering thereof. Thereafter, the sealing gasket is snugly applied to the neck portion 12$^a$ so that the annular membrane 15$^a$ is confined between the sealing gasket 14 and the bung-hole base portion 12$^b$. In this manner the bung-hole bushing 12, sealing gasket 14 and protecting ring 15 can be shipped in an assembled state, the cooperation of the tightly fitting gasket with the annular membrane of the protecting ring preventing the loss of either part.

Turning next to FIGS. 5–7, there is shown a slightly modified shipping container bung-hole construction which is somewhat similar in construction and operation to the arrangement described above and also embodying the present invention. In view of the similarity between the two exemplary constructions of the invention, like parts in both modifications will be designated by identical reference numerals.

As shown in FIGS. 5 and 6, the bung-hole bushing 12 in the modified assembly also includes a neck portion 12$^a$ which is inserted into the container wall collar 11$^a$, and with a base portion 12$^b$ extending laterally from the neck portion. However, in this form of container the base portion 12$^b$ is positioned exteriorly of the container, the interior of which is again under the container wall 11 shown in the drawings. Again, the base portion 12$^b$ is accommodated in a recessed portion of the container wall 11.

Before inserting the bung-hole bushing 12 into the bung-hole, a sealing gasket 14 which, for example, may be made of rubber, is positioned on the neck portion 12$^a$ substantially in the corner between the neck portion and the base portion. Inasmuch as the agressive fluid may approach the sealing gasket 14 from the other side in this modified construction, the protecting ring 15 is now positioned on the neck portion 12$^a$ substantially in side-by-side relationship to the sealing gasket and encircling the neck 12$^a$. Thus after assembly of the bung-hole construction (FIG. 5), the sealing gasket 14 is effectively protected by the protecting ring 15 from fluid penetrating past the bead or curl by means of which the bung-hole bushing 12 is secured in the bung-hole and to the collar 11$^a$ of the container wall 11 surrounding that hole.

With the exemplary constructions of the invention, excellent results have been obtained with a protecting ring 15 having a substantially square cross section and a radial width and an axial height which are about one-half of the width and height of the sealing gasket 14, the latter also having a substantially square cross section. This, of course, applies to the parts before their assembly. However, while these dimensions are preferable, it has been found that advantageous results are obtained as long as the cross-sectional area of the protecting ring 15 is in the range of 1/10 to 1/4 of the cross-sectional area of the gasket 14. That is, the thickness and width of the protecting ring should be on the order of 1/2 to 1/3 the thickness and width of the gasket.

By way of summary, it will be appreciated that a shipping container embodying the present invention is formed in the following manner: forming a bung-hole in the sheet metal container wall 11; inserting a bung-hole bushing 12 into the bung-hole while interposing a sealing gasket 14 (made of a resilient material which substantially retains its resiliency when subjected to continuous pressure such, for example, as rubber) and a protecting ring 15 (made of a material having a high resistance to aggressive fluids, solvents, detergents and the like, such, for example, as polyethylene or similar thermoplastic material) between the container wall 11 and the bushing 12, the protecting ring 15 separating the gasket 14 from the interior of the container; securing the bung-hole bushing 12 to the container wall 11 so as to deform the gasket 14 and ring 15 therebetween; and uniting the container wall with other wall portions (not shown) to form a container.

Of course, while the exemplary form of the invention shown in FIGS. 1–3 has been described in connection with a protecting ring 15 having an annular membrane 15a, those skilled in the art will appreciate that the protecting ring shown in FIG. 8 could be used if desired; i.e., the membrane 15a could be eliminated. Moreover, the membrane 15a could be secured to another portion of the protecting ring 15, for example, at approximately the midpoint of its axial height.

We claim as our invention:

1. A shipping container for sorting aggressive fluids and the like and having a sheet metal wall, a bung-hole bushing secured to the container wall and defining a bung-hole therein, a sealing gasket interposed between said bung-hole bushing and said container wall and entirely isolated by said bushing and said wall from contact with aggressive fluids on the exterior portions of said wall, said sealing gasket being made of a resilient material which substantially retains its resiliency when subjected to continuous pressure, and a protecting ring interposed between said bushing and said wall and separating said gasket from the interior of the container, said protecting ring being in engagement with said gasket so that swelling of the latter urges said ring into sealing engagement with said wall, said protecting ring made of a material having a high resistance to the fluids stored in the container.

2. A shipping container as set forth in claim 1 and further characterized in that said protecting ring has a cross-sectional area which is in the range of 1/10 to 1/4 of the cross-sectional area of said sealing gasket.

3. A shipping container as set forth in claim 1 and further characterized in that said sealing gasket and said protecting ring both have a substantially square cross-section, the thickness and the width of said protecting ring being in the range of 1/2 to 1/3 of those of said sealing gasket.

4. A shipping container for use in storing aggressive fluids and the like and having a sheet metal wall, a bung-hole bushing secured to the container wall and defining a bung-hole therein, said bung-hole bushing formed with an annular neck portion and a base portion extending laterally from said neck portion, a sealing gasket made of a resilient material which substantially retains its resiliency when subjected to continuous pressure, said sealing gasket being snugly located around said neck portion, and a protecting ring in engagement with said gasket and interposed between said gasket and the interior of said container, said protecting ring made of a material having a high resistance to aggressive fluid, said protecting ring having an inner diameter which is larger than the outer diameter of said sealing gasket when the latter is in the unstressed state, said ring having an annular inwardly projecting membrane the inner annular edge of which is confined between said sealing gasket and said base portion of said bung-hole bushing.

5. A bung-hole assembly comprising, in combination a bushing having a bung-hole formed therein, said bushing having an annular neck portion and a base portion extending laterally from said neck portion, a sealing gasket made of a resilient material which substantially retains its resiliency when subjected to continuous pressure, said sealing gasket being snugly located around said neck portion, and a protecting ring made of a material having a high resistance to aggressive fluids, said protecting ring being in engagement with said sealing gasket and having an inner diameter which is larger than the outer diameter of said sealing gasket when the latter is in the unstressed state, said ring having an annular inwardly projecting membrane the inner annular edge of which is confined between said sealing gasket and the base portion of said bushing.

6. A shipping container for storing aggressive fluids and the like and having a sheet metal wall, a bung-hole bushing secured to the container wall and defining a bung-hole therein, said bung-hole bushing having an annular neck portion and a base portion extending laterally from said neck portion, said base portion positioned interiorly of said container, a sealing gasket positioned in the corner between said neck portion and said base portion and substantially in engagement with both of said bung-hole bushing portions, said sealing gasket being made of a resilient material which substantially retains its resiliency when subjected to continuous pressure, and a protecting ring in engagement with and encircling said sealing gasket and substantially in engagement with said base portion and said wall for separating said gasket from the interior of the container, said protecting ring made of a material having a high resistance to the fluids stored in the container.

7. A shipping container as set forth in claim 6 and further characterized in that said protecting ring has secured thereto an annular inwardly projecting membrane extending between said sealing gasket and said base portion.

8. A shipping container for storing aggressive fluids and the like and having a sheet metal wall, a bung-hole bushing secured to the container wall and defining a bung-hole therein, said bung-hole bushing having an annular neck portion and a base portion extending laterally from said neck portion, said base portion positioned interiorly of said container, a sealing gasket positioned in the corner between said neck portion and said base portion and substantially in engagement with both of said bung-hole bushing portions, said sealing gasket being made of a resilient material which substantially retains its resiliency when subjected to continuous pressure, and a protecting ring mounted on said neck portion substantially in axial side-by-side relationship to said sealing gasket and in engagement therewith for separating said gasket from the interior of the container, said protecting ring made of a material having a high resistance to the fluids stored in the container.

References Cited by the Examiner

UNITED STATES PATENTS

| 1,884,602 | 10/32 | Dillhoefer | 285—204 |
| 2,424,567 | 7/47 | Hill | 277—212 |
| 2,798,742 | 7/57 | Parish et al. | 285—204 |
| 2,857,184 | 10/58 | Mancus | 277—165 |
| 3,011,803 | 12/61 | Buckner et al. | 285—23 |

THERON E. CONDON, *Primary Examiner.*

FRANKLIN T. GARRETT, GEORGE O. RALSTON, *Examiners.*